Oct. 27, 1925.
E. B. HESS ET AL
TYPEWRITING MACHINE
Filed Dec. 11, 1924
1,559,167
3 Sheets-Sheet 1
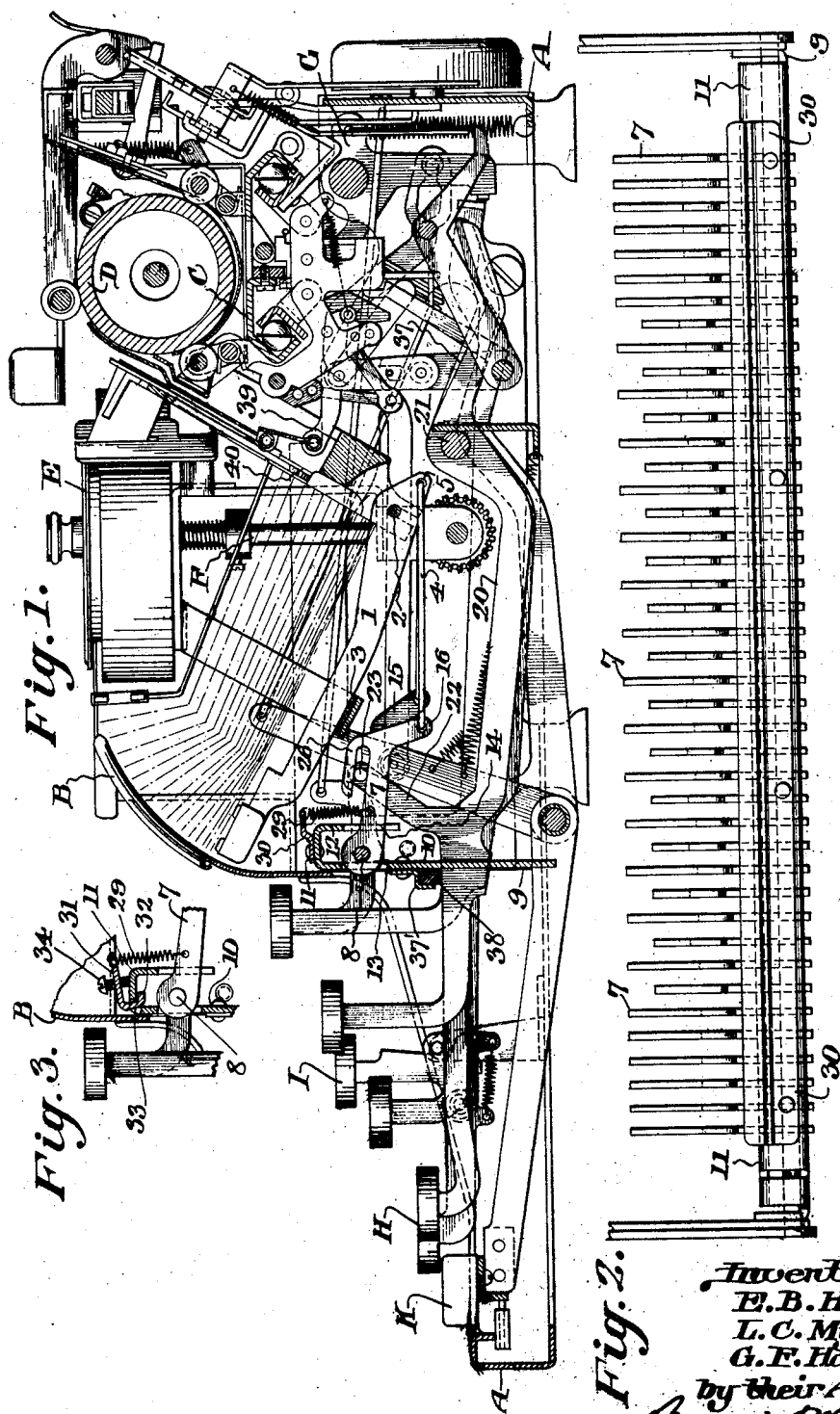
Inventors
E. B. Hess
L. C. Myers
G. F. Handley
by their Attorneys

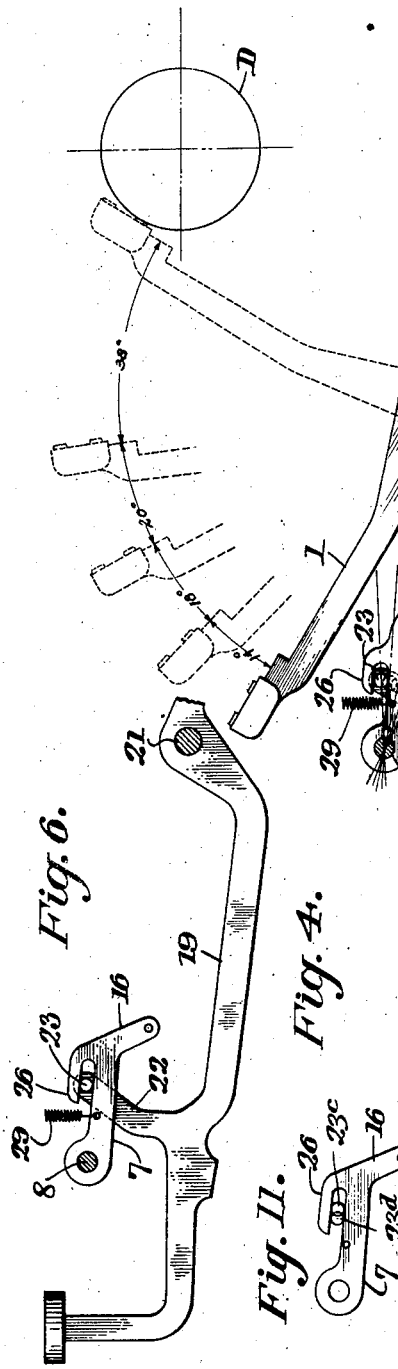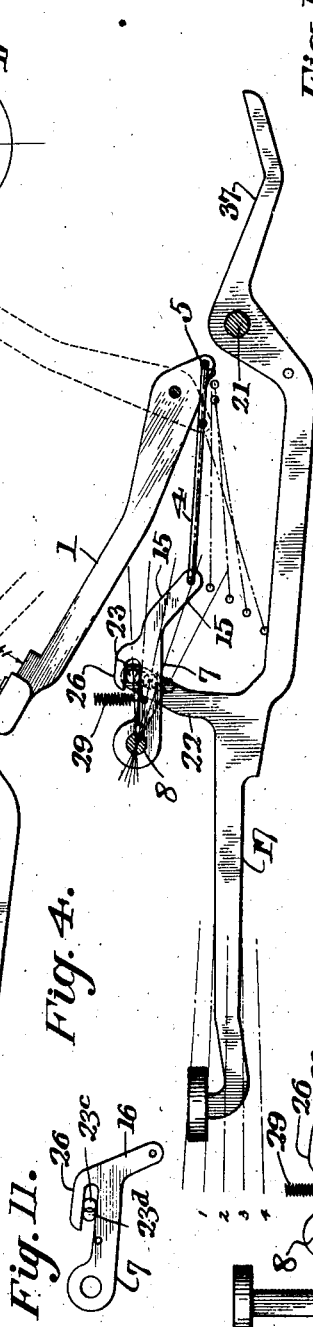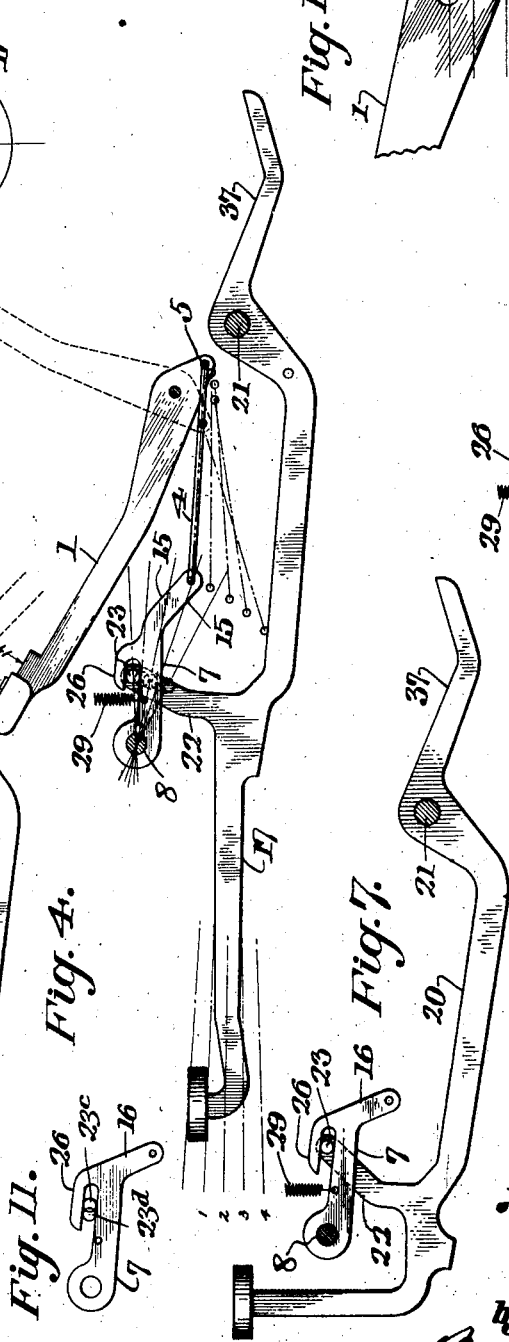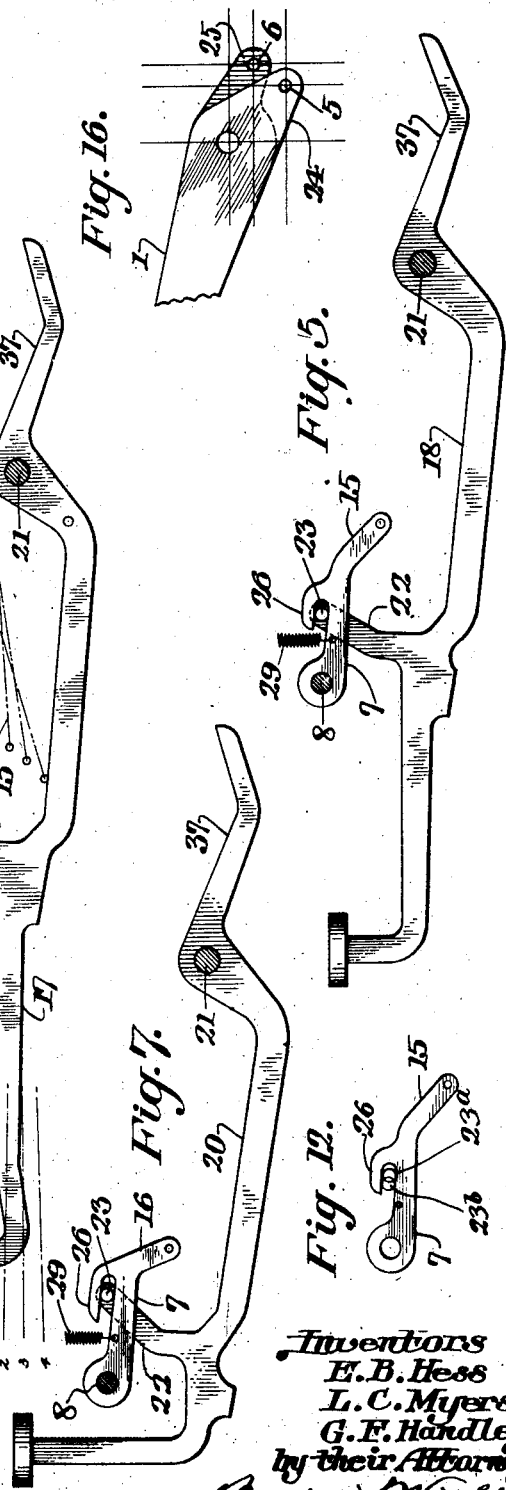

Oct. 27, 1925.
E. B. HESS ET AL
1,559,167
TYPEWRITING MACHINE
Filed Dec. 11, 1924  3 Sheets-Sheet 3
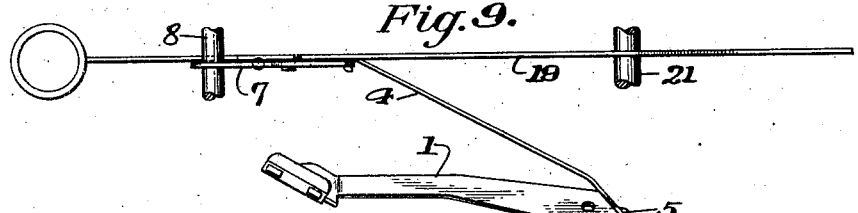
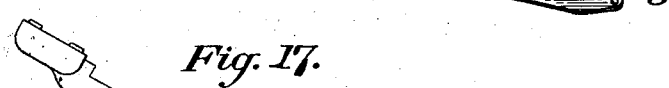
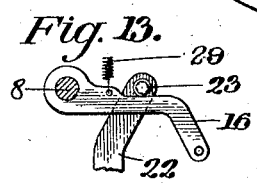
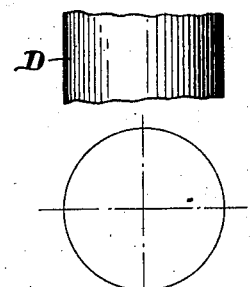
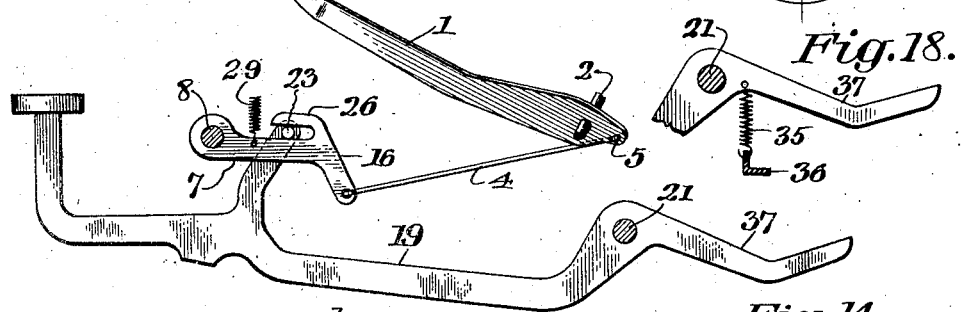
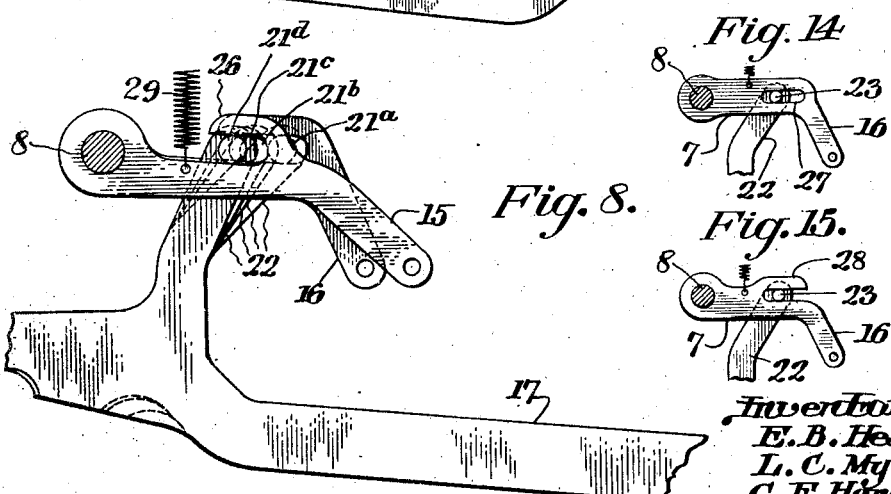
Inventors
E. B. Hess
L. C. Myers
G. F. Hindley
by their Attorneys
Baldwin Wight Patented Oct. 27, 1925.

1,559,167

UNITED STATES PATENT OFFICE.

EDWARD B. HESS, OF NEW YORK, LEWIS C. MYERS, OF FREEPORT, AND GEORGE F. HANDLEY, OF GLENDALE, NEW YORK, ASSIGNORS TO ROYAL TYPEWRITER COMPANY, INC., OF NEW YORK, N. Y., A CORPORATION OF NEW YORK.

TYPEWRITING MACHINE.

Application filed December 11, 1924. Serial No. 755,181.

*To all whom it may concern:*

Be it known that we, EDWARD B. HESS, a citizen of the United States, and resident of New York, in the county and State of New York; LEWIS C. MYERS, a citizen of the United States, and resident of Freeport, in the county of Nassau and State of New York; and GEORGE F. HANDLEY, a citizen of the United States, and resident of Glendale, in the county of Queens and State of New York, have invented certain new and useful Improvements in Typewriting Machines, of which the following is a specification.

This invention relates primarily to a type action and related features of a typewriting machine of the visible type. It is more especially concerned with a type action suitable for a small compact portable machine in which considerations of space are extremely important. The invention has been illustrated in connection with a machine wherein the type bars when at the printing point lie at an angle of about 30° to the perpendicular or otherwise stated wherein a tangent to the platen at the printing point makes an angle of 30° with the vertical. The shift movement of the platen is, therefore, substantially parallel to such a tangent. While the type action herein described is of special value in connection with a machine of this general type, nevertheless many or all of the features may be used elsewhere in combination with machines of different forms. The type action herein illustrated is one in which the type bar has an extremely accelerated movement, the last quarter of the depression of the key lever affecting almost half of the movement of the type bar from its normal position of rest to its printing position.

An object of the invention is to provide an accelerating type action which is extremely compact and wherein all of the type keys have a uniform depression.

Another object of the invention is the provision of a type action wherein special provision is made for the operation of the keys lying at the extreme side of the type basket.

A further object of the invention is to provide a novel form of connection between the type bar and its associated key lever whereby an accelerated motion is produced by a simple and very compact construction.

A further object of the invention is to provide a novel form of returning springs for the type action with provision for a collective tensioning of said springs.

A still further object is to provide the key lever with a portion extending rearwardly beyond its pivot in a particular manner for the actuation of the universal bar and thereby the escapement mechanism.

Other objects of the invention will be set forth in the following detailed description and recited in the appended claims.

In the drawings:—

Figure 1 is a longitudinal section with parts in elevation showing a typewriting machine with our invention embodied therein.

Figure 2 is a top plan view showing the form and mounting of the front links of the type action.

Figure 3 is a detailed view of a modification of the means for adjusting the tension of the springs.

Figure 4 is a diagrammatic view of a single type action showing in dotted lines the position of the type bar corresponding to various positions of the key in its depression. This figure shows one of the first or lowest keys in the keyboard.

Figure 5 shows a key lever of the second bank of keys.

Figure 6 shows a key lever of the third bank of keys.

Figure 7 shows a key lever of the fourth or top bank of the key-board.

Figure 8 is a side fragmentary view showing the relative positions of the front links and co-acting portions of the key levers of the four banks of keys.

Figure 9 is a top plan view of a key lever and a type bar in its normal position.

Figure 10 is a side elevation of a complete type action located near the center of the key-board.

Figure 11 is a side elevation of one form of front link which co-operates with the key levers of the third and fourth banks, the engaging points of both banks being indicated.

Figure 12 is a similar view of the front link employed with the key levers of the first and second banks.

Figure 13 shows a modification of the engagement between the front link and the key lever.

Figure 14 shows another modification in which a pin and slot connection is employed.

Figure 15 shows a still further modification in which the guide slot is open toward the rear.

Figure 16 is a fragmentary view showing different forms of the heels of the type bars located at the center and sides of the machine.

Figure 17 is a side elevation of two type bars showing substantially the same construction.

Figure 18 shows a modified form of returning spring for the type action.

The drawings illustrate a typewriting machine having a frame A, front cover B, carriage C, with the usual appurtenances, platen D, ribbon spools E, drive shafts F therefor, a shift frame G, a shift key H, a shift lock key I, a space key K, and various other features which are usual in typewriting machines. So far as the present invention is concerned these parts may be of varying construction and they have been illustrated merely to show the type of machine in which applicant's invention is herein embodied and the general relation of the type action to the remainder of the machine.

A series of type bars 1 which are supported on a pivot rod 2 normally engage a type rest 3 at about the middle thereof. They extend forward from the pivot point at an angle of approximately 60° to the vertical and swing through an angle of about 90° to the printing point. At the time of printing the type bars therefore make an angle of about 30° with a vertical line passing through the center of the platen. Type bar links 4 are attached to the heels of the type bar at points 5 and 6, all of which are below and behind the pivot rod 2. These type bar links extend forwardly and at their forward ends are pivoted to front links 7. These front links 7 are all pivoted on a common rod 8 carried in a frame 9 similar to that shown in patent to Hess and Myers No. 1,417,910, May 30, 1922. This frame has a vertical portion 10, a substantially horizontal top portion 11, and a downwardly extending portion 12 substantially parallel to the part 10. Slots 13 and 14 in the portions 10 and 12 respectively guide the front links 7 in their movement.

There are two forms of front links employed, a long link such as shown in Figures 4 and 5 for the first and second or two lowest rows of key levers counting from the lowest front row toward the rear of the machine. The third and fourth rows of key levers are connected to a short link 7 as shown in Figures 6 and 7. All of these links 7 are similar in form, the body or horizontal portion being substantially the same size although that of the short links is or may be slightly longer than that of the long link. The downward extension 15, however, of the long link is longer and extends rearwardly at a less angle to the body than do the extensions 16 of the short links.

The key levers are arranged in four banks as is usual with a universal key-board and have different shapes, the four forms being shown at 17, 18, 19 and 20 in Figures 4, 5, 6 and 7 respectively. All of the key levers are pivoted on a common pivot rod 21 or an equivalent mounting. Each key lever has an upward and rearward extension 22 provided with a pin 23 which overlies the body of the front link 7. A depression of any key lever therefore will pull down on its associated front link 7 and through this movement which is transmitted by the type bar link 4 to the type bar it moves the type bar to printing position.

The pins 23 engage the front link at varying distances from the pivot of the latter. Figure 12 shows the long link which is employed with the key levers of the first and second rows as illustrated in Figures 4 and 5. The position of the pin 23 for the first row is shown at 23$^a$ and the position of the pin 23 for the second row is indicated at 23$^b$. Similarly Figure 11 shows the form of link 7 used in the two higher rows or the third and fourth banks of keys and the positions of the pin corresponding thereto are shown at 23$^c$ and 23$^d$ respectively.

Reference to Figure 2 will show that the long and short front links 7 are arranged alternately through the central portion of the machine only and that there are seven long links at the right hand side of the keyboard and six long links at the left hand side. Reference to Figures 16 and 17 will show that the heels 24 of the type bars 1 at the center of the machine are somewhat different in form from the heels 25 of the type bars at the sides of the machine. The points of the attachment 5 and 6 of the type bar links also vary.

The result of the employment of the differing forms of links and varying points of engagement of the pins 23 with said links together with the varying position of the point of attachment of the link 4 to the heel of the type bar enables the proper movement of the type bars to be obtained by a uniform depression of the key levers regardless of the fact that the keys are located at differing distances from the pivot of the key levers. It further enables the production of a very compact and simple type action.

The particular form of construction constituting the subject matter of this invention produces an accelerating action as is clearly illustrated in Figure 4. The dip of the key lever 17 is shown as being divided into four portions and the corresponding positions of the type bar link 4 and its point of attachment to the front link 7 as well as the different positions of the point of engagement between the pin 23 and the front link 7 are shown. It will be seen that the four equal portions of the dip of the type key lever result in varying movements of the type bar and that the last quarter of the movement of the key produces an angular movement of 38° of the total of 90° through which the type bar moves. This permits the type bar to move away from the platen into position to be free from interference from other type bars upon a very slight rise of the depressed key.

In the preferred form shown at Figures 1, 4 and 5 each front link 7 is provided with an integral finger 26 which overlies the pin 23 and together with the body of the link constitutes virtually an open ended slot with the opening facing forwardly. This tends to prevent accidental disengagement of the pin 23 and the link and has a further function hereinafter set forth. Various modified forms of this feature may, however, be employed.

In the form shown in Figure 13 the finger 26 is omitted entirely and the pin 23 merely engages the upper edge of the front link 7. In the modification shown in Figure 14, the pin 23 engages in a slot 27 in the front link, which slot is closed at both ends. In the modification shown in Figure 15, a finger 28 overlies the pin 23 but extends rearwardly so that the slot is opened at the rear end.

So far as the operation of the type action upon the depression of the key is concerned, it is relatively immaterial which of these forms of construction is employed. It is merely necessary that the position of the pin 23 may change with relation to the pivot of the link 7. There is substantially a sliding engagement between these two parts although the sliding movement is very slight. It will be noted that since the key lever turns about the axis of the pivot rod 21 while the front link about the axis of the pivot rod 8 that the parts are so related that during the depression of the key lever the point of engagement of the pin 23 with the link 15 approaches the axis of the pivot rod 8 thereby giving a decreasing leverage connection and producing an accelerated movement of the type action.

In order to return the type action to normal position there is preferably employed a series of springs 29 attached at their lower ends to the front links 7 between the pivot 8 and the point of engagement of the pins 23 with these links. The other end of the springs 29 are secured to a plate 30 carried by the top portion 11 of the front link guide frame 9. This plate may be rigid with relation to the guide frame as shown in Figure 1. Figure 3 shows a modified form in which a plate 31 to which the springs 29 are attached has inturned parts 32 which hook into a slot 33 formed in the guide frame 9.

A screw or screws 34 are threaded through the plate 31 and bear at their free ends against the top 11 of the guide frame. It is obvious that the position of the plate 31 and the corresponding tension of the springs 29 may be varied by proper adjustment of the screws 34. This furnishes a collective adjustment of all of the springs 29.

This construction enables the entire type action to be returned to normal position by one spring. This spring exerts its force directly upon the front link 7 which through the pin 23 transmits the movement to the key lever.

As shown in Figure 18 a modified form of returning spring may be employed for the key levers. These springs 35 are attached to the key levers at a point slightly in rear of the fulcrum 21 and at their other ends are attached to a plate 36 supported in any desired manner by the frame of the machine. This plate may be fixed or adjustable as desired. If the form of engagement between the front link and the pin 23 shown in Figure 13 is used, this modified form of returning spring cannot be advantageously employed, since a movement of the key lever and pin 23 to normal position would exert no influence whatever upon the front line 7 and the type bar. One function of the overlying finger 26 or 28 is therefore to return the whole type action to normal position whenever the returning spring, such as shown in Figure 18, is employed.

All of the key levers are provided with extensions 37 of uniform length extending to the rear of the pivot 21. These extensions are first inclined slightly downwardly and then have a similar upwardly inclined portion. These extensions are for the purpose of operating the universal bar and through this the escapement ribbon vibrator and other instrumentalities which are usually operated from the universal bar. The particular form of extension is of value as enabling the construction of a very compact device wherein this part of the structure does not interfere with the proper positioning of other elements.

The frame plate 9 is also slotted for the passage of the key levers as in the patent above referred to. On the front side of this plate is attached an annular plate 37′ which retains a strip of resilient material 38 to act as a silent for the return movement of the key levers.

The pivot wire 2 for the type bars is mounted in a type segment 39 which has on its forward side an abutment 40 against which the type bars strike to limit their movement toward printing position.

It will be seen from the foregoing that our invention provides a very simple and efficient accelerating type action that is compact and well adapted for use in a portable machine although capable of employment elsewhere. The particular arrangement described enables a uniform light depression upon all of the keys of the key-board and a single return spring may be used for each type action to return all parts to normal position. These returning springs may be collectively adjusted if desired. It is obvious that various features of the invention may be modified and that parts thereof may be employed in other relations without in any way departing from the spirit of the invention. It is understood that the invention is to be regarded as limited only by the scope of the appended claims.

We claim as our invention:

1. In a typewriting machine, a type action comprising a type bar, a key lever, a pivoted horizontal front link, a connection between the free end of the front link and the type bar, and a sliding connection between the key lever and the upper edge of the front link intermediate its ends.

2. In a typewriting machine, a type action comprising a type bar, a key lever, a substantially horizontal front link pivoted at its front end, a connection between the free end of the front link and the type bar, and a pin carried by the key lever and overlying the front link.

3. In a typewriting machine, a type action comprising a type bar, a key lever, a substantially horizontal front link pivoted at its front end, a connection between the free end of the front link and the type bar, and an upward extension on the key lever carrying a pin slidingly engaging the front link.

4. In a typewriting machine, a type action comprising a type bar, a key lever, a substantially horizontal front link pivoted at its front end, a connection between the front link and the type bar, and an upward extension on the key lever having a pin and slot connection with the front link intermediate the ends of the latter.

5. In a typewriting machine, a type action comprising a type bar, a key lever, a substantially horizontal front link pivoted at its front end, a connection between the front link and the type bar, an upward extension on the key lever carrying a pin which engages the upper edge of the front link, and a finger on said front link overlying said pin.

6. In a typewriting machine, a type action comprising a type bar, a key lever, a front link having a substantially horizontal body portion and pivoted at its front end, and having a rearwardly and downwardly projecting extension, a connection between said extension and the type bar, and means affording a sliding engagement between the key lever and the front link.

7. In a typewriting machine, a type action comprising a type bar, a key lever, a front link having a substantially horizontal body portion and pivoted at its front end, and having a rearwardly and downwardly projecting extension, a connection between said extension and the type bar, and an upward extension on the key lever carrying a pin which slidably engages the front link.

8. In a typewriting machine, a type action comprising a type bar, a key lever, a front link having a substantially horizontal body portion and pivoted at its front end, and having a rearwardly and downwardly projecting extension, and an upward extension on the key lever having a pin and slot connection with the front link intermediate the ends of the latter.

9. In a typewriting machine, a series of type actions, each action comprising a key lever, type bar, pivoted front link, a connection between the front link and the type bar, and a sliding connection between the key lever and the front link, the front links being alternately long and short throughout the center of the machine.

10. In a typewriting machine, a series of type actions, each action comprising a key lever, type bar, pivoted front link, a connection between the front link and the type bar, and a sliding connection between the key lever and the front link, the front links being alternately long and short throughout the center of the machine, and a plurality of adjacent links at each side of the machine being long.

11. In a typewriting machine, a series of type actions, each action comprising a key lever, type bar, pivoted front link, a connection between the front link and the type bar, and a sliding connection between the key lever and the front link, the front links being alternately long and short throughout the center of the machine, said key levers having keys arranged in banks and the levers of the upper banks being connected to the short links.

12. In a typewriting machine, a series of type actions, each action comprising a key lever, type bar, pivoted front link, a connection between the front link and the type bar, and a sliding connection between the key lever and the front link, the front links being alternately long and short throughout the center of the machine, the bodies of the front links being substantially horizontal and having rearward extensions arranged at different angles for the two forms of links.

13. In a typewriting machine, a plurality of key levers, the keys of which are arranged in banks, a type bar for each key lever, a front link for each key lever, a connection between the type bar and the front link, and a sliding connection between the key lever and the front link, the point of engagement thereof with the link being different for the key levers of each bank.

14. In a typewriting machine, a plurality of key levers, the keys of which are arranged in banks, a type bar for each key lever, a front link for each key lever, the front links being alternately long and short throughout the center of the machine, a connection between the type bar and the front link, and a sliding connection between the key lever and the front link, the point of engagement thereof with the link being different for the key levers of each bank.

15. In a typewriting machine, a plurality of key levers, the keys of which are arranged in banks, a type bar for each key lever, a front link for each key lever, the front links being alternately long and short throughout the center of the machine, and a plurality of adjacent links at each side of the machine being long, a connection between the type bar and the front link, and a sliding connection between the key lever and the front link, the point of engagement thereof with the link being different for the key levers of each bank.

16. In a typewriting machine, a plurality of key levers, the keys of which are arranged in banks, a type bar for each key lever, a front link for each key lever, a connection between the type bar and the front link, and a sliding connection between the key lever and the front link, the point of engagement thereof with the link being different for the key levers of each bank, and a plurality of front links at the sides of the machine being connected to the type bars at points different from the center links.

17. In a typewriting machine, a plurality of key levers, the keys of which are arranged in banks, a type bar for each key lever, a front link for each key lever, the front links being alternately long and short throughout the center of the machine, and a plurality of adjacent links at each side of the machine being long, a connection between the type bar and the front link, and a sliding connection between the key lever and the front link, the point of engagement thereof with the link being different for the key levers of each bank, the long links at the side being connected to the type bars at points different from the remainder.

18. In a typewriting machine, a series of type actions each action comprising a key lever, type bar, pivoted front link, a link connection between the front link and the type bar, and a sliding connection between the key lever and the front link, the connections from the front links to the type bars at the sides of the machine being made at a different point on the type bars than the remainder.

19. In a typewriting machine, a series of type actions each action comprising a key lever, type bar, pivoted front link, a link connection between the front link and the type bar, and a sliding connection between the key lever and the front link, the connections from the front links to the type bars at the sides of the machine being made at points lying higher and farther to the rear than is the case with the remainder of the bars.

20. In a typewriting machine, a series of pivoted type bars lying normally at an angle of about 60 degrees to the vertical and adapted to be moved through approximately ninety degrees to the printing point, and intermediate accelerating connections for so moving them comprising front links and key levers having a sliding constantly decreasing leverage engagement.

21. In a typewriting machine, a series of centrally pivoted type bars with heads lying normally well below the printing point and adapted to be moved to an angle of about 30 degrees with the vertical when at the printing point, and intermediate accelerating connections for so moving them comprising substantially horizontal front links and key levers having a sliding constantly decreasing leverage engagement.

22. In a typewriting machine, the combination of a type action including a type bar, a substantially horizontal pivoted front link, a connection therefrom to the type bar, and a key lever connected to the front link, of a guide frame for the front link, a plate carried thereby, and returning means for the type action including a substantially vertical spring connected to the front link and to the said plate.

23. In a typewriting machine, the combination of a type action including a type bar, a pivoted front link, a connection therefrom to the type bar, and a key lever connected to the front link, of a guide frame for the front link, a plate carried thereby, and returning means for the type action including a spring connected to the front link and to the said plate, both the key lever and the spring being connected to the front link between its pivot point and its point of connection to the type bar.

24. In a typewriting machine, the combination of a type action including a type bar, a substantially horizontal pivoted front link, a connection therefrom to the type bar, and a key lever connected to the front link, of a guide frame for the front link, a plate adjustably carried thereby, and returning means for the type action including a substantially vertical spring connected to the front link and to the said plate.

25. In a typewriting machine, the combination of a type action including a type bar, a pivoted front link, a connection therefrom to the type bar, and a key lever connected to the front link, of a guide frame for the front link, a plate adjustably carried thereby, and returning means for the type action including a spring connected to the front link and to the said plate, both the key lever and the spring being connected to the front link between its pivot point and its point of connection to the type bar.

26. In a typewriting machine, the combination of a series of type actions including pivoted front links, an inverted U-shaped guide frame therefor, a plate carried by the base of said frame, and returning means for said actions including springs connected to the links and to the plate.

27. In a typewriting machine, the combination of a series of type actions including pivoted front links, an inverted U-shaped guide frame therefor, a plate adjustably carried by the base of said frame, and returning means for said actions including springs connected to the links and to the plate.

28. In a typewriting machine the combination with type actions including key levers and front links, of a frame having slots for guiding said front links, a plate carried by said frame, and means retained by said plate for limiting the return movement of the key levers.

29. In a typewriting machine the combination with type actions including key levers and front links, of a frame having slots for guiding said front links and other slots for guiding the key levers, a plate supported by said frame, and means retained by said plate for limiting the return movement of the key levers.

30. In an obliquely arranged typewriting machine, a series of type actions, each comprising a type bar, a flexing connection and a key lever having sliding engagement therewith, one end of the flexing connections being operably connected to the respective type bars at points lying in different horizontal and vertical planes with reference to the type bar pivots.

In testimony whereof, we have hereunto subscribed our names.

EDWARD B. HESS.
LEWIS C. MYERS.
GEORGE F. HANDLEY.